(12) United States Patent
Watanabe et al.

(10) Patent No.: US 6,359,261 B1
(45) Date of Patent: Mar. 19, 2002

(54) SILICON NITRIDE SINTERED BODY, PROCESS FOR PRODUCING THE SAME, CERAMIC HEATER EMPLOYING THE SILICON NITRIDE SINTERED BODY AND GLOW PLUG CONTAINING THE CERAMIC HEATER

(75) Inventors: Shindo Watanabe; Masahiro Konishi, both of Aichi (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/696,547

(22) Filed: Oct. 25, 2000

(30) Foreign Application Priority Data

Oct. 29, 1999 (JP) .......................... 11-308946

(51) Int. Cl.[7] .............................. F23Q 7/00
(52) U.S. Cl. ................. 219/270; 219/544; 219/553
(58) Field of Search ............... 219/270, 544, 219/553, 541; 501/87, 97.1, 97.2, 97.4

(56) References Cited

U.S. PATENT DOCUMENTS

| | | | |
|---|---|---|---|
| 4,626,451 A | * | 12/1986 | Tanaka et al. ............ 427/123 |
| 4,804,823 A | * | 2/1989 | Okuda et al. ............. 219/553 |
| 4,891,342 A | * | 1/1990 | Yokoyama ................ 501/97.2 |
| 5,135,893 A | * | 8/1992 | Dohi et al. ............... 501/91 |
| 5,233,166 A | * | 8/1993 | Maeda et al. ............. 219/552 |
| 5,411,923 A | * | 5/1995 | Suzuki .................... 501/98.3 |
| 5,750,958 A | * | 5/1998 | Okuda et al. ............. 219/267 |
| 6,242,374 B1 | * | 6/2001 | Komatsu .................. 501/97.2 |

FOREIGN PATENT DOCUMENTS

| | | |
|---|---|---|
| EP | 0 933 342 A2 | 8/1999 |
| JP | 61136963 A | 6/1986 |
| JP | 5148034 A | 6/1993 |
| JP | 7089767 A | 4/1995 |
| JP | 9097858 A | 4/1997 |

\* cited by examiner

Primary Examiner—Teresa Walberg
Assistant Examiner—Vinod D. Patel
(74) Attorney, Agent, or Firm—Brinks Hofer Gilson & Lione

(57) ABSTRACT

The invention comprehends a silicon nitride sintered body having consistent qualities, a process for producing the same, a ceramic heater employing the silicon nitride sintered body as a substrate and a glow plug containing the ceramic heater as a heat source. In the production of a silicon nitride sintered body through a hot press method, a sintering aid protecting agent is added to the raw material. The employable protecting agents are metallic elements such as Ta, W and Mo and compounds of the metallic elements such as nitrides and silicides. Conversion of these elements and compounds to carbides occurs preferentially to reduction of the sintering aid. Thus, it becomes possible to suppress reduction of the sintering aid in a reducing atmosphere formed, for example, of carbon monoxide, which is generated particularly when a graphite pressing die is employed. A ceramic heater which comprises a substrate formed from the silicon nitride sintered body and a resistance heater embedded in the substrate is obtained. Further, a glow plug containing the ceramic heater serving as a heat source is obtained.

6 Claims, 2 Drawing Sheets

SILICON NITRIDE SINTERED BODY, PROCESS FOR PRODUCING THE SAME, CERAMIC HEATER EMPLOYING THE SILICON NITRIDE SINTERED BODY AND GLOW PLUG CONTAINING THE CERAMIC HEATER

BACKGROUND OF THE INVENTION

1. Field of the Invention

The present invention relates to a silicon nitride sintered body; a process for producing the same; a ceramic heater employing the silicon nitride sintered body serving as a substrate; and a glow plug containing the ceramic heater. More particularly, the present invention relates to a silicon nitride sintered body which can suppress reduction of a sintering aid such as silicon oxide occurring in a reducing atmosphere formed by a carbonaceous component during firing, and which sintered body has consistent qualities such as excellent bending strength without variation and is sufficiently densified through to the surface, and to a process for producing the sintered body. The present invention also relates to a ceramic heater employing the silicon nitride sintered body, which heater can be utilized for a variety of uses and whose properties such as mechanical strength and electrical resistance demonstrate negligible variation, and to a glow plug containing the ceramic heater serving as a heat source and employable in diesel engines.

2. Description of Related Art

Silicon nitride is sintered by the action of a liquid phase formed from a sintering aid during heating. The melting point of the formed liquid phase is known to vary in relation to the compositional ratio between a main sintering aid such as MgO, $Al_2O_3$—$Y_2O_3$, or $RE_2O_3$ (RE: rare earth element) and $SiO_2$, which serves as an additional sintering aid and is contained in silicon nitride raw material. The sinterability is greatly affected by variations in the melting point, thereby varying the quality of the produced sintered body.

When a silicon nitride sintered body is produced through hot pressing, a pressing die made of graphite is typically employed, thereby providing a reducing atmosphere for firing. Therefore, an oxide sintering aid, particularly silicon oxide partially undergoes reduction, and the compositional proportions of sintering aids vary. As a result, sinterability is greatly affected as described above, and sintered bodies having consistent physical properties are difficult to produce, because of intra-lot and inter-lot variations in quality of the produced sintered bodies. In addition, since a portion of the raw material in the vicinity of the pressing die is insufficiently sintered, a silicon nitride sintered body fully densified through to the surface may not be produced.

SUMMARY OF THE INVENTION

The present invention has been made to solve the aforementioned problems. The silicon nitride sintered body of the first aspect of the invention contains a carbide which is converted from a sintering aid protecting agent (hereinafter referred to as a "protecting agent") which prevents reduction of a sintering aid due to a carbonaceous component contained in a reducing atmosphere during hot press firing.

As described in the second aspect of the invention, examples of protecting agents having a high melting point include at least one species from among Ta, W, Mo and compounds thereof. Of these, elements, nitrides, and silicides, such as W, TaN and $MoSi_2$, which are readily converted to carbides thereof in a reducing atmosphere, are preferable.

As described in the third aspect of the invention, the sintering aid contains silicon oxide and the protecting agent contains a metal and/or metallic compound which can be converted to carbide more easily than silicon oxide.

As described in the fourth aspect of the invention, sintering aids including a rare earth element oxide and silicon oxide are employed and reduction of the sintering aids is sufficiently prevented, thereby efficiently producing a silicon nitride sintered body having a grain boundary phase containing $RE_2SiO_5$ and/or $RE_2Si_2O_7$.

In the fifth aspect of the invention, there is provided a process for producing a silicon nitride sintered body, which process comprises obtaining a compact from a material containing silicon nitride raw material powder, sintering aid powder and a protecting agent; placing the compact in a pressing die; placing the pressing die holding the compact in a firing furnace and hot press firing.

In the sixth aspect of the invention, there is provided a ceramic heater containing a substrate and a resistance heater, wherein the substrate is formed of a silicon nitride sintered body as recited in any one of the first to fourth aspects of the invention.

The seventh aspect of the invention comprehends a glow plug containing a ceramic heater as recited in the sixth aspect of the invention.

Accordingly, it is an object of the present invention to provide a silicon nitride sintered body which can suppress reduction of a sintering aid occurring when a firing atmosphere becomes a reducing atmosphere due to a carbonaceous component, particularly when a pressing die formed of graphite is used, and which silicon nitride sintered body has consistent qualities such as excellent bending strength without variation and is sufficiently densified through to the surface.

Another object of the present invention is to provide a process for producing the sintered body.

Still another object of the present invention is to provide a ceramic heater which employs the silicon nitride sintered body as a substrate and which has reduced variation in properties such as mechanical strength and electrical resistance.

Yet another object of the present invention is to provide a glow plug containing the ceramic heater as a heat source.

DESCRIPTION OF THE PREFERRED EMBODIMENTS

Figure 1:
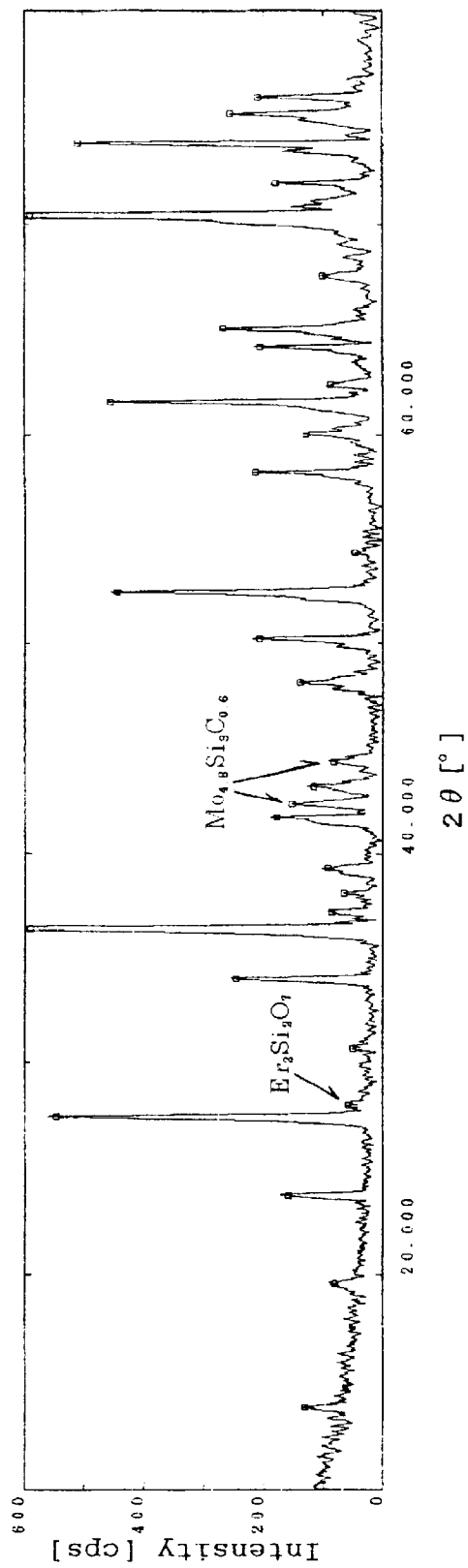
FIG. 1 is a graph showing an X-ray diffraction pattern of a silicon nitride sintered body of Example 7.

The silicon nitride sintered body embodying the present invention, the ceramic heater containing the silicon nitride sintered body serving as a substrate and other aspects of the invention will now be described in detail.

The silicon nitride sintered body of the first aspect of the invention contains a carbide which is converted from a sintering aid protecting agent (hereinafter referred to, as noted above, as a "protecting agent") which prevents reduction of a sintering aid due to a carbonaceous component contained in a reducing atmosphere during hot press firing.

The silicon nitride sintered body herein may be a sintered body formed exclusively of silicon nitride or a sintered body of sialon, containing an element in addition to nitrogen and silicon elements.

The aforementioned protecting agent may be a substance which itself is converted to a carbide preferentially to reduction of the aforementioned "sintering aid." (In the first aspect of the invention, the term "sintering aid" refers to oxygen contained as an impurity in silicon nitride raw material and a variety of oxides serving as sintering aids during firing as well as an intentionally added sintering aid such as a rare earth element oxide or $Al_2O_3$—$Y_2O_3$.) Since the temperature for hot press firing is typically as high as 1750° to 1850° C., the protecting agent preferably has a melting point higher than the firing temperature. Furthermore, the protecting agent, the aforementioned formed "carbide" thereof, and a similar component preferably do not have a detrimental effect on the properties of silicon nitride sintered bodies such as bending strength.

Through incorporation of the protecting agent, reaction between a sintering aid and carbon and resultant variation in the compositional proportions of sintering aids are suppressed, so that sintered bodies having consistent qualities can be produced. In addition, the produced sintered bodies are sufficiently densified through to the surface.

In the second aspect of the invention, examples of protecting agents having a high melting point include at least one species from among Ta, W, Mo and compounds thereof. Of these, elements, nitrides, and silicides, such as W, TaN and $MoSi_2$, which are readily converted to carbides thereof in a reducing atmosphere, are preferable. Conversion of these elements and compounds to the corresponding carbides during firing in a reducing atmosphere can readily be confirmed through X-ray diffraction of the sintered body.

Among sintering aids, silicon oxide is particularly readily reduced. Thus, preferably, in the third aspect of the invention, the sintering aid contains silicon oxide and the protecting agent contains a metal and/or metallic compound which can be converted to carbide more easily than silicon oxide. The protecting agent employed in the second aspect of the invention may also be employed in the third aspect of the invention. Silicon oxide is typically incorporated in 3 to 10 mol % based on the total amount of silicon nitride raw material and sintering aids so as to sufficiently enhance sinterability. When raw material containing such an amount of silicon oxide is employed, the protecting agent is preferably added in a sufficient amount to attain a reduction-preventing effect.

In addition, in the fourth aspect of the invention, sintering aids including a rare earth element oxide and silicon oxide are employed and reduction of the sintering aids is sufficiently prevented, thereby efficiently producing a silicon nitride sintered body having a grain boundary phase containing $RE_2SiO_5$ and/or $RE_2Si_2O_7$. In order to completely generate these high melting point compounds, a rare earth element oxide is preferably incorporated in an amount of 1 to 5 mol %, more preferably 2 to 4 mol %, and silicon oxide is preferably incorporated in an amount of 3 to 10 mol %, more preferably 5 to 8 mol %, on the basis of the total amount of silicon nitride raw material and sintering aids.

Rare earth element oxides such as $RE_2Si_2O_7$ are also stable in a high temperature oxidizing atmosphere and can be employed as a substrate for a variety of heaters contained in glow plugs and like elements. Formation of these high melting point compounds can readily be confirmed through X-ray diffraction of the sintered body.

The silicon nitride sintered bodies of the first to fourth aspects of the invention have a bending strength of 1000 to 1400 MPa, preferably 1100 to 1400 MPa, more preferably 1150 to 1400 MPa, particularly preferably 1200 to 1400 MPa as measured in accordance with JIS R 1601. The difference between the minimum bending strength and the average bending strength is 150 MPa or less, preferably 100 MPa or less, more preferably 75 MPa or less, particularly preferably 50 MPa or less. The ratio of the difference between the minimum bending strength and the average bending strength to the average bending strength is 15% or less, preferably 10% or less, more preferably 7% or less, particularly preferably 5% or less. Further, the ratio can be reduced to 3% or less. The difference between the minimum bending strength and the maximum bending strength is 250 MPa or less, preferably 200 MPa or less, more preferably 160 MPa or less, particularly preferably 130 MPa or less.

The present aspect of the invention provides a silicon nitride sintered body having consistent qualities, i.e., such as a sufficiently high bending strength, particularly without a large decrease in minimum bending strength.

In the fifth aspect of the invention, there is provided a process for producing a silicon nitride sintered body, which process comprises obtaining a compact from a material containing silicon nitride raw material powder, sintering aid powder and a sintering aid protecting agent; placing the compact in a pressing die; placing the pressing die holding the compact in a firing furnace; and hot press firing, wherein the sintering aid protecting agent is converted to a carbide in a reducing atmosphere formed of a carbonaceous component contained in at least one of the pressing die and the firing furnace.

The aforementioned "silicon nitride raw material" predominantly comprises silicon nitride powder and an optional small amount of powder of other compounds such as aluminum nitride and alumina in combination. The silicon nitride raw material contains oxygen and a variety of oxides as impurities typically in an amount of 0.5 to 2 wt. %, particularly 0.8 to 1.5 wt. %. In many cases, a rare earth element oxide powder is employed as the aforementioned "sintering aid powder." However, oxide powder, e.g., MgO or $Al_2O_3$—$Y_2O_3$, which is typically employed for firing silicon nitride to form a sintered body may also be used. Silicon oxide powder may also be used. These sintering aids may be used singly or are used in many cases in a combination of two or more species.

The protecting agent employed in the second and third aspects of the invention may also be employed. No particular limitation is imposed on the amount of the protecting agent, and the protecting agent is incorporated in an amount of 1 to 20% by volume, preferably 1 to 15% by volume, more preferably 1 to 10% by volume, particularly preferably 1 to 5% by volume, on the basis of the total volume of the silicon nitride raw material and the sintering aids. When the protecting agent is incorporated in excess of the predetermined amount, the unconverted protecting agent remains in the produced sintered bodies. In contrast, when the amount is less than 20% by volume, the unconverted protecting agent does not greatly affect the density and properties (e.g., bending strength) of sintered bodies.

No particular limitation is imposed on the firing conditions such as temperature and time during hot press firing and firing can be carried out under commonly employed conditions. In many cases, a graphite-made pressing die is employed, and a pressing die made of a material such as silicon carbide may also be employed. During hot press firing, the reducing atmosphere is formed not only from the graphite in the pressing die but also from carbon monoxide generated from a carbonaceous component contained in the firing furnace. In both cases, the aforementioned protecting agent is effective in preventing reduction.

The sixth aspect of the invention comprehends a ceramic heater containing a substrate and a resistance heater, wherein the substrate is formed of a silicon nitride sintered body as disclosed in any one of the first to fourth aspects of the invention.

The aforementioned "substrate" of the ceramic heater, formed of a silicon nitride sintered body as recited in the first to fourth aspects of the invention, exhibits consistent qualities, i.e., excellent bending strength, and is sufficiently densified through to the surface. Thus, a ceramic heater with consistent qualities which exhibits excellent properties such as heat resistance and durability and small variation in bending strength and electrical resistance can be provided. When the substrate contains a specific carbide, the thermal expansion coefficient thereof increases, thereby providing a negligible difference between the thermal expansion coefficient of the resistance heater and that of the substrate. Thus, cracking of the substrate or the resistance heater can be prevented. When a silicon nitride sintered body as recited in the first to fourth aspects of the invention is employed as the substrate of the ceramic heater, the protecting agent is preferably incorporated in an amount of 15% by volume or less in order to attain good electrical insulation.

The aforementioned "resistance heater" comprises an electrically insulating component and an electrically conductive component.

The insulating component comprises a silicon nitride sintered body which may be a sintered body containing only silicon nitride or which may be sialon. The resistance heater is embedded in the substrate, and the entirety is fired. Therefore, the heater is not greatly influenced by the reducing atmosphere. The silicon nitride sintered body as recited in the first to fourth aspects of the invention may be employed as the silicon nitride sintered body serving as the insulating component.

The conductive component employs a fired product produced from at least one species of silicides, carbides, or nitrides of at least one metallic element selected from among W, Ta, Nb, Ti, Mo, Zr, Hf, V and Cr. Particularly, the conductive component preferably has a thermal expansion coefficient which is close to that of the silicon nitride sintered body serving as the substrate or that of the silicon nitride sintered body serving as the insulating component. A conductive component having such an expansion coefficient prevents cracking of the substrate and the resistance heater during use of the heater. Examples of materials of such conductive components include WC, $MoSi_2$, and TiN. These conductive components preferably have a melting point higher than the operating temperature of the ceramic heater and have excellent heat resistance. When the melting point of the conductive component is high, heat resistance of the ceramic heater in the operating temperature range increases.

A ceramic heater of the sixth aspect of the invention can be produced in the following manner.

A powder comprising a silicide, carbide, or nitride of a metallic element such as W, Ti or Mo is employed as a raw material powder of the conductive component, and silicon nitride powder is employed as a raw material powder of the insulating component. The powder for producing the conductive component, the powder for producing the insulating component, and sintering aid powder are mixed in predetermined proportions, to thereby prepare a powder mixture. Customary mixing methods such as wet-mixing may be employed. No particular limitation is imposed on the sintering aid powder, and powder of a sintering aid, such as a rare earth element oxide typically employed for firing silicon nitride, may be used. More preferred is a powder of a sintering aid such as $Er_2O_3$ which forms a crystalline phase in grain boundaries as a result of sintering in order to attain an increase in heat resistance.

To the thus-prepared powder mixture, an appropriate amount of binder is added. The resultant mixture is kneaded, granulated, and molded, e.g., injection molded, to thereby produce a compact which provides a resistance heater after firing of the compact. A metallic lead wire is provided at predetermined positions on the compact.

The thus-prepared compact is embedded in a raw material powder containing silicon nitride raw material powder and a protecting agent for producing the substrate. For example, the compact is placed in a predetermined position between two compact halves of the raw material powder, and the resultant assembly is pressed at approximately 50 to 120 bar (50 to 120 atmospheres, atm), thereby producing a ceramic heater compact in which a compact to serve as a resistance heater is embedded in a powder compact shaped into the substrate. The ceramic heater compact is placed in a pressing die made of material such as graphite and the die is placed in a firing furnace where hot press firing is carried out at a predetermined temperature for a predetermined time, thereby producing a ceramic heater. No particular limitation is imposed on the firing temperature and time and the firing temperature is 1700° to 1850° C., preferably 1800° to 1850° C., and the firing time is 30 to 180 minutes, preferably 60 to 120 minutes.

The seventh aspect of the invention comprehends a glow plug containing a ceramic heater as recited in the sixth aspect of the invention.

In the ceramic heater of the sixth aspect of the invention, variation in the composition due to the reducing atmosphere is suppressed. Thus, the ceramic heaters exhibit mechanical strength and electrical resistance with only negligible variation between products, consistent quality and excellent durability. As a result, the glow plug of the seventh aspect of the invention also exhibits consistent qualities, with problems such as fracture of heaters during use being overcome.

I. Silicon Nitride Sintered Body

A. Evaluation of bending strength

Silicon nitride raw material powder (90 mol %), $Er_2O_3$ powder serving as a sintering aid (3 mol %) (the raw material powder further contains unavoidable oxygen and oxides in an amount of 7 mol % as reduced to $SiO_2$, and the oxygen species work as sintering aids during firing), and a metal or metallic compound serving as a protecting agent shown in Table 1 were mixed (at compositional proportions shown in Table 1) under wet conditions for 40 hours, and the resultant mixture was dried, to thereby produce a raw material powder. The raw material powder was placed in a pressing die and hot press fired at 1800° C. for one hour in a nitrogen atmosphere. The thus-produced sintered body was polished, and cut into test pieces having dimensions of 40mm (length)×4 mm (width)×3mm (thickness). Ten pieces were prepared for each Example, and the bending strength of the test pieces was measured under the below-described conditions.

Bending strength: A 3-point bending strength was measured in accordance with JIS R 1601 (span: 20 mm; and cross head speed: 0.5 mm/sec).

The test results are shown in Table 1, below. In Table 1, the symbol * indicates that a value marked therewith falls outside the scope of the first aspect of the invention.

TABLE 1

| Examples | $Si_3N_4$ | $Er_2O_3$ | $SiO_2$ | Protecting agent/Vol % | Final products after firing | Bending strength (MPa) min./av./max. | Variation in resistance $3\sigma$ (m$\Omega$) |
|---|---|---|---|---|---|---|---|
| 1 | 90 | 3 | 7 | *— | — | 982/1189/1244 | 104 |
| 2 | | | | Ta/5 | TaC | 1161/1233/1289 | 66 |
| 3 | | | | TaN/5 | | 1143/1202/1302 | 57 |
| 4 | | | | W/5 | $WC + W_2C$ | 1126/1208/1288 | 68 |
| 5 | | | | *$WSi_2$/5 | $WSi_2$ | 884/1122/1266 | 111 |
| 6 | | | | Mo/5 | $Mo_{4.8}Si_3C_{0.6}$ | 1185/1244/1311 | 65 |
| 7 | | | | $MoSi_2$/2 | | 1174/1205/1277 | 57 |
| 8 | | | | $MoSi_2$/5 | | 1202/1289/1325 | 62 |
| 9 | | | | $MoSi_2$/20 | $Mo_{4.8}Si_3C_{0.6} + MoSi_2$ | 1095/1188/1246 | 71 |

Compositional proportions of $Si_3N_4$, $Er_2O_3$, and $SiO_2$ are on the basis of mol %.

As is clear from the results shown in Table 1, silicon nitride sintered bodies produced in Examples 2 to 4 and 6 to 9, which sintered bodies fall within the scope of the present invention, each have a minimum bending strength of 1095 to 1202 MPa, an average bending strength of 1188 to 1289 MPa, and a maximum bending strength of 1246 to 1325 MPa; and particularly, no test piece exhibiting a minimum bending strength less than 1000 MPa was found. In contrast, the test pieces in Example 1, where no protecting agent was added, show a large variation in bending strength, indicating possible variation in compositional proportions caused by reduction. The test pieces in Example 5, where stable $WSi_2$ not serving as a protecting agent was added, show a large variation in bending strength and a decrease in bending strength due to variable sinterability. In Example 10, excess $MoSi_2$ which was not converted to carbide still remained; however, the bending strength was not greatly affected.

B. Confirmation of carbide formation

The sintered body of Example 7 was subjected to X-ray diffraction. A graph in FIG. 1 shows the results where diffraction peaks attributed to $Mo_{4.8}Si_3C_{0.6}$ can be identified, from which it is understood that $MoSi_2$ incorporated as a protecting agent was converted to a carbide. The graph also indicates formation of a high melting point crystalline phase formed of $Er_2Si_2O_7$.

II. Ceramic Heater

A. Production of ceramic heater

A sintering aid powder formed of $RE_2O_3$ (rare earth element oxide) (2 to 5 mol %), unavoidable oxygen and oxides serving as sintering aids during firing (2 to 15 mol % as reduced to $SiO_2$), and silicon nitride (balance) were mixed to thereby prepare a raw material powder for an insulating component. The raw material powder for an insulating component and WC powder serving as a raw material powder for a conductive component were weighed so as to attain a volume ratio of 75 : 25, and the resultant mixture was mixed under wet conditions for 72 hours and dried, to thereby prepare a powder mixture. Subsequently, the powder mixture and a binder were charged into a kneader and kneaded for 4 hours. The resulting kneaded substance was cut into pellets. The thus-obtained pellets were charged into an injection molding machine, yielding a U-shaped green which was to serve as a resistance heater and which had tungsten lead wires inserted into the opposite ends thereof.

In another process, silicon nitride raw material powder (90 mol %), a sintering aid powder formed of $Er_2O_3$ (3 mol %) (plus unavoidable oxygen and oxides (7 mol % as reduced to $SiO_2$)), and $MoSi_2$ serving as a protecting agent (2% by volume) were mixed. The resulting mixture was mixed under wet conditions for 40 hours, followed by granulation through a spray drying method. The thus-obtained granules underwent compaction so as to obtain two compact halves. Subsequently, the green to serve as a heating resistor was held in place between the two compact halves. The resulting assembly was subjected to press forming so that the green was embedded between the two compact halves. The pressed assembly was further pressed at substantially 70 bar (70 atm) for integration, obtaining a green ceramic heater. The green ceramic heater was calcined at 600° C. so as to remove the binder. Subsequently, the calcined compact was set in a hot press carbon die and was then hot press fired at 1800° C. for one hour in a nitrogen atmosphere, thereby yielding a ceramic heater.

B. Evaluation of variation in electrical resistance

Ceramic heaters having an electrical resistance of approximately 700 m$\Omega$ were produced as described in Section II. A., above, and the electrical resistance of each ceramic heater was measured, to thereby evaluate variation in the resistance. Heaters produced in Examples 2 to 4 and 6 to 9, which heaters fall within the scope of the present invention, exhibited a $3\sigma$ (3 standard deviations) of 57 to 68 m$\Omega$, indicating only a small variation in resistance among products. Thus, it is assumed that the silicon nitride sintered body of the present invention provides ceramic heaters exhibiting small intra-firing lot and inter-firing lot variation in resistance and consistent temperature elevation characteristics.

The foregoing resistance values were measured through a DC 4-terminal method using a "Milliohm Hitester" (product of Hioki Denki).

C. Structures of Ceramic Heater and Glow Plug Containing the Heater

Figure 2:
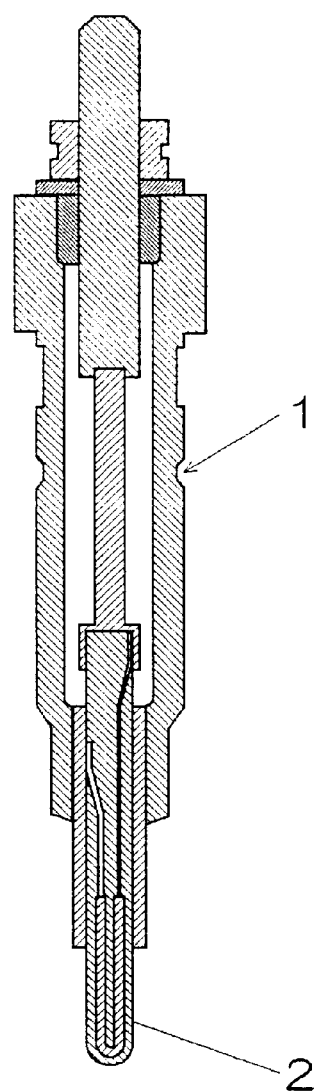
FIG. 2 is a longitudinal sectional view of a glow plug into which a ceramic heater of the present invention is incorporated.
Figure 3:
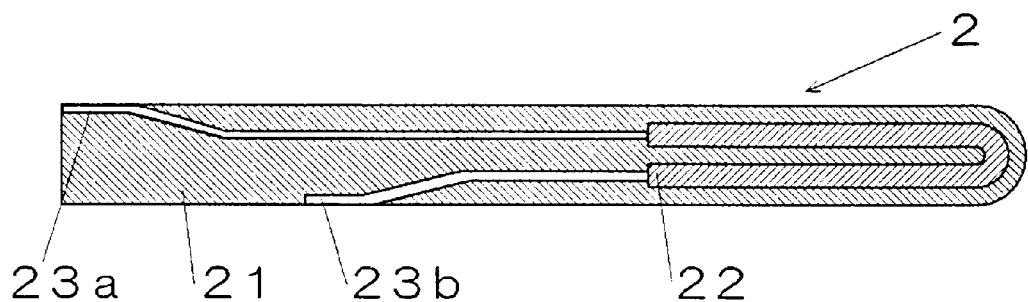
FIG. 3 is a longitudinal sectional view of the ceramic heater.

FIG. 3 is a longitudinal sectional view showing a ceramic heater 2 which was produced in the manner described in Section II. A., above. FIG. 2 is a longitudinal sectional view showing a glow plug 1 into which the ceramic heater 2 is incorporated. As shown in FIG. 2, the glow plug 1 includes the ceramic heater 2 disposed at a tip end portion thereof at which heat is generated. As shown in FIG. 3, the ceramic heater 2 includes a substrate 21, a resistance heater 22 and lead portions 23a and 23b.

The substrate 21 is formed of a silicon nitride sintered body and is adapted to protect the embedded resistance heater 22 and the lead portions 23a and 23b. The resistance heater 22 assumes the form of a U-shaped bar and is embedded in the substrate 21. In addition, the resistance heater 22 contains a conductive component and an insulating component. As shown in FIG. 3, one end of each lead portion 23a, 23b formed of tungsten is located on the surface of the substrate 21 and the other end is connected to the corresponding end of the resistance heater 22, so that electricity supplied to the ceramic heater 2 from an external power source can be led to the resistance heater 22.

The present invention is not limited to the aforementioned Examples, and various changes can be made in accordance with purpose and use without departing from the scope of the invention. Briefly, the ceramic heater of the present invention can be employed not only in glow plugs but also as a heater for a variety of heating systems. The silicon nitride sintered body of the present invention can be adapted to other uses such as refractory and tools manufactured by use of a hot press method.

The first aspect of the invention provides a silicon nitride sintered body which suppresses conversion of a sintering aid to carbide in the vicinity of a pressing die even when firing is performed by a hot press method and which has consistent qualities such as excellent bending strength and is sufficiently densified through to the surface. The fifth aspect of the invention provides a process for readily producing a silicon nitride sintered body having consistent qualities as recited in the first to fourth aspects of the invention.

In addition, the ceramic heater of the sixth aspect of the invention employs a silicon nitride sintered body as recited in the first to fourth aspects of the invention. Thus, the heater has consistent qualities and excellent properties such as excellent bending strength. The glow plug of the seventh aspect of the invention, employing the ceramic heater of the sixth aspect of the invention as a heat source, exhibits consistent qualities, and breakage of the plug during use can be prevented.

What is claimed is:

1. A silicon nitride sintered body, containing a carbide resulting from conversion of a sintering aid protecting agent which prevents reduction of a sintering aid caused by a carbonaceous component during hot press firing.

2. The silicon nitride sintered body according to claim 1, wherein the sintering aid protecting agent is selected from the group consisting of Ta, W, Mo and compounds thereof.

3. The silicon nitride sintered body according to claim 1, wherein the sintering aid contains silicon oxide and the sintering aid protecting agent contains at least either a metal or metallic compound which can be converted to carbide more easily than silicon oxide.

4. The silicon nitride sintered body according to claim 1, wherein the sintering aid includes a rare earth element oxide and silicon oxide and the silicon nitride sintered body has a grain boundary phase containing at least either $RE_2SiO_5$ or $RE_2Si_2O_7$.

5. A ceramic heater containing a substrate and a resistance heater, wherein the substrate is formed of the silicon nitride sintered body as recited in claim 1.

6. A glow plug containing the ceramic heater as recited in claim 5.

* * * * *